United States Patent [19]

Nye

[11] Patent Number: 5,727,667
[45] Date of Patent: Mar. 17, 1998

[54] MACHINE FOR VALIDATING CHECKS AND AUTHENTICATING PAPER MONEY

[75] Inventor: Andrew B. Nye, Lansing, N.Y.

[73] Assignee: NCR Corporation, Dayton, Ohio

[21] Appl. No.: 554,641

[22] Filed: Nov. 6, 1995

[51] Int. Cl.⁶ .............................................. G07F 7/04
[52] U.S. Cl. .................................. 194/207; 382/135
[58] Field of Search ............................. 194/206, 207; 382/135

[56] References Cited

U.S. PATENT DOCUMENTS

| | | |
|---|---|---|
| 3,980,990 | 9/1976 | Berube . |
| 4,283,708 | 8/1981 | Lee .............................. 209/534 X |
| 4,458,143 | 7/1984 | Gitlis . |
| 4,487,306 | 12/1984 | Nao et al. . |
| 4,536,709 | 8/1985 | Ishida . |
| 4,556,140 | 12/1985 | Okada . |
| 4,574,190 | 3/1986 | Nishimura ........................ 235/449 |
| 4,584,529 | 4/1986 | Aoyama . |
| 4,593,184 | 6/1986 | Bryce et al. . |
| 4,617,458 | 10/1986 | Bryce . |
| 4,628,194 | 12/1986 | Dobbins et al. ................. 382/135 X |
| 4,743,743 | 5/1988 | Fukatsu ........................... 235/379 |
| 4,758,714 | 7/1988 | Carlson et al. . |
| 4,764,725 | 8/1988 | Bryce . |
| 5,005,688 | 4/1991 | Yukimoto et al. ................. 194/206 |
| 5,068,519 | 11/1991 | Bryce . |
| 5,151,607 | 9/1992 | Crane et al. . |
| 5,430,664 | 7/1995 | Cargill et al. ................... 194/207 X |
| 5,495,929 | 3/1996 | Batalianets et al. ............... 194/207 |

*Primary Examiner*—F. J. Bartuska
*Attorney, Agent, or Firm*—Mark Levy; Francis L. Conte

[57] ABSTRACT

This invention features a machine for both validating checks and authenticating paper currency. The check validating apparatus of the machine is made up of a photo-sensor, a magnetizing unit, a magnetic head reader, a pair of feed rollers and a stepper motor drive for rotatively driving the feed rollers. The machine uses the same internal apparatus for authenticating paper currency bills. A currency bill is introduced to the nip of the feed rollers. The photo-sensor senses the presence of the currency bill and activates the stepper motor drive. The stepper motor drive then causes the feed rollers to rotate, drawing the bill into the machine. The microprocessor program initially instructs the stepper motor to rotate the feed rollers for forward drive, utilizing half-step pulsing. As the currency bill moves past the magnetizing unit and magnetic head reader on forward motion into the machine, a strip of the bill is magnetized. After a calculated number of pulses required for the bill to pass the magnetizing unit and the magnetic head reader, the program instructs a reverse drive direction for the stepper motor, and a simultaneous change of drive phase to wave-drive stepping. The magnetized strip is read as it is discharged from the machine at constant speed. A program in the microprocessor compares the signature on the bill with genuine currency signatures for bills of denominations. If there is a match, the bill is then authenticated.

10 Claims, 2 Drawing Sheets

MACHINE FOR VALIDATING CHECKS AND AUTHENTICATING PAPER MONEY

FIELD OF THE INVENTION

The present invention pertains to reading magnetic indicia imprinted on checks and magnetic signatures on currency bills, and, more particularly, to a machine for use in a retail store which has dual capabilities of reading checks' magnetic characters and authenticating Federal Treasury signatures on paper currency.

BACKGROUND OF THE INVENTION

It has recently become useful for tradespeople in retail establishments and markets to validate their customers' checks. Prevalent in commercial usage now are small, desktop machines that print receipts for transactions and validate customer checks. One such machine is Model No. 7156, manufactured by Axiohm Corporation of Ithaca, N.Y.

A check to be validated is fed into the above-identified machine by a stepper motor drive unit. The check is driven into the machine until all of the magnetic ink numbers have passed through a magnetizing unit. Then, without stopping, the stepper motor is reversed, and the machine discharges the check at constant speed. During the machine's discharge phase, the magnetic ink numbers on the check's surface pass a reader head, where they are read and decoded.

The check-reading apparatus of this check-validation machine can also be employed to accurately determine the authenticity of currency bills. All that is required to achieve the added capability is slightly modifying the machine's programming and circuitry.

The invention's validation method comprises the steps of: feeding a check, having magnetizable ink numbers disposed along an edge thereof, into a check-validation machine; moving the check forward into the check-validation machine, using a half-step drive for stepping the motor drive unit; magnetizing the ink numbers as the check moves past a magnetizing unit in said machine; changing the phase of the stepper motor drive to wave drive, while simultaneously reversing the drive direction; and, finally, reading the magnetized numbers on the surface of the check, as the check is discharged from the machine at a constant speed.

Secondly, the invention's authentication method comprises the steps of: feeding a paper-currency bill into a check-validation and currency-authentication machine; moving the currency forward into the check-validation and currency-authentication machine, using a step drive for stepping the stepper motor drive unit; magnetizing the currency's ink along a strip of the bill, as the bill moves past a magnetizing unit in said machine; reversing the drive direction of the stepper motor, and thereby discharging said currency bill; reading the magnetized strip on the bill's surface, as the check is being discharged from the machine at a constant speed, with the magnetized strip bearing a signature; comparing the bill's currency signature with known Federal Treasury currency signatures; and, finally, authenticating the currency bill, when the read signature matches a genuine currency signature.

SUMMARY OF THE INVENTION

In accordance with the present invention, there is provided a machine that both validates checks and authenticates paper money. The check-validating apparatus of this machine comprises a photo-sensor, a magnetizing unit, a magnetic head reader, a pair of feed rollers and a stepper motor drive for rotatively driving the feed rollers. A check is introduced to the nip of the feed rollers. The photo-sensor detects the presence of the check and activates the stepper motor drive. The stepper motor drive then causes the feed rollers to rotate, drawing the check into the validating machine. The microprocessor instructs the stepper motor to feed and discharge the check into and out of the machine, according to a specialized program. The microprocessor program initially instructs the stepper motor to rotate the feed rollers for forward drive, utilizing half-step pulsing. As the check moves past the magnetizing unit and the magnetic head reader, on forward motion into the validating machine, the magnetizable numbers are magnetized. After the calculated number of pulses required for the check to pass the magnetizing unit and the magnetic head reader, the program instructs a reverse-drive direction for the stepper motor, and a simultaneous change of drive phase to wave-drive stepping. The check is read as it is discharged from the machine at a constant speed.

A slight modification of the check validation process provides currency authentication. A programmable microprocessor is reprogrammed to provide the additional, Federal Treasury currency signature recognition capacity. The machine uses the same internal apparatus as that needed for the check validation capability.

A paper currency bill is introduced to the nip of the feed rollers. The photo-sensor detects the presence of the bill and activates the stepper motor drive. The stepper motor drive then causes the feed rollers to rotate, drawing the bill into the combination validation-and-authentication machine. The microprocessor program initially instructs the stepper motor to rotate the feed rollers for forward drive, utilizing half-step pulsing. As the currency moves past the magnetizing unit and the magnetic head reader, on forward motion into the validation-and-authentication machine, a strip of the bill is magnetized. After a calculated number of pulses required for the bill to pass the magnetizing unit and the magnetic head reader, the program instructs a reverse drive direction for the stepper motor, and a simultaneous change of drive phase to wave-drive stepping. The magnetized strip is read as it is being discharged from the machine at a constant speed. A program in the microprocessor compares the Federal Treasury signature on the bill (of various denominations) with known currency signatures. If there is a match, the bill is then authenticated.

It is an object of this invention to provide a check-validating machine having a second capability, viz., paper-money authentication.

It is another object of this invention to provide a check-validating machine that is modified to have a programmed capability for authenticating a bill of paper currency by magnetically recognizing the Federal Treasury signatures thereon.

BRIEF DESCRIPTION OF THE DRAWINGS

A complete understanding of the present invention may be obtained by reference to the accompanying drawings, when considered in conjunction with the subsequent detailed description, in which.

For the purposes of brevity and clarity, like elements and components will bear the same numbering and designations throughout the FIGURES.

DESCRIPTION OF THE PREFERRED EMBODIMENT

Generally speaking, the invention features a machine that has the dual capability of paper currency bill authentication and check validation. The machine has a microprocessor that is programmed to magnetically recognize Federal Treasury signatures on bills of various denominations. A bill that is fed into the machine has a strip thereof magnetized as it passes a magnetizing unit. Upon discharge, the magnetized strip is read, with the information fed to the microprocessor for authentication.

Figure 1:
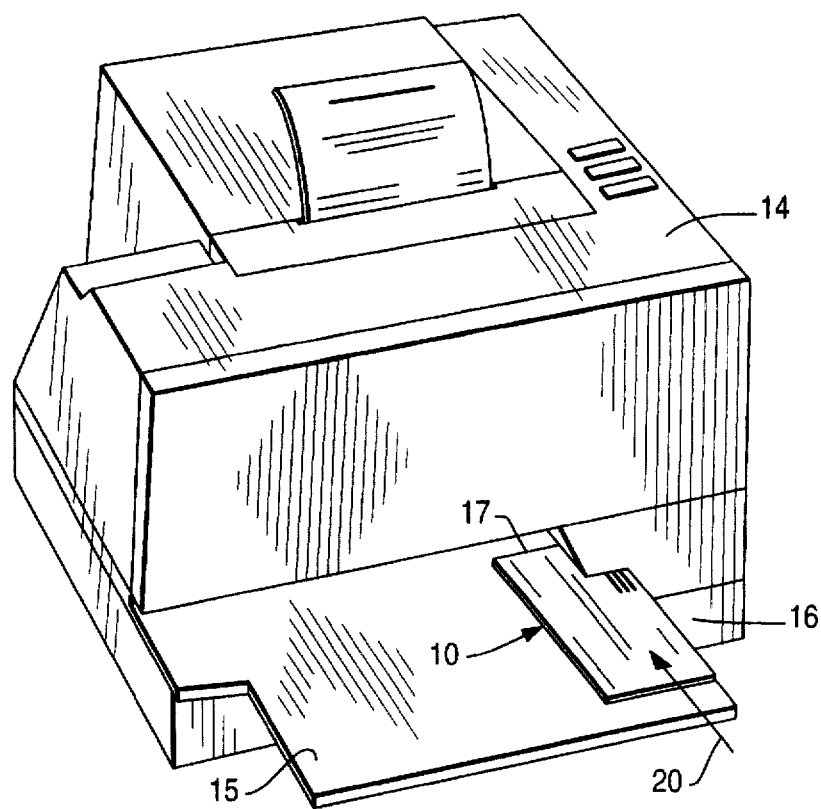
FIG. 1 illustrates a frontal, perspective view of this invention's machine for validating checks and authenticating paper money, with an in situ view of a bill of currency being introduced into the machine for authentication.

Referring to FIG. 1, this invention's machine 14 for validating checks and authenticating paper currency is shown. For purposes of simplifying this description, only the currency authentication mode is described. A currency bill 10 is introduced into the check-validation and currency-authentication machine 14 in the same manner as a check is usually introduced into the machine. The currency bill 10 is guided into the machine 14 by a vertical guide wall 16 disposed on the right-hand side of machine 14. The currency bill is pushed by hand (arrow 20) into the machine 14, until the frontal edge 17 of the bill 10 reaches the nip 21 (see FIG. 2) of a pair of feed rollers 24.

Figure 2:
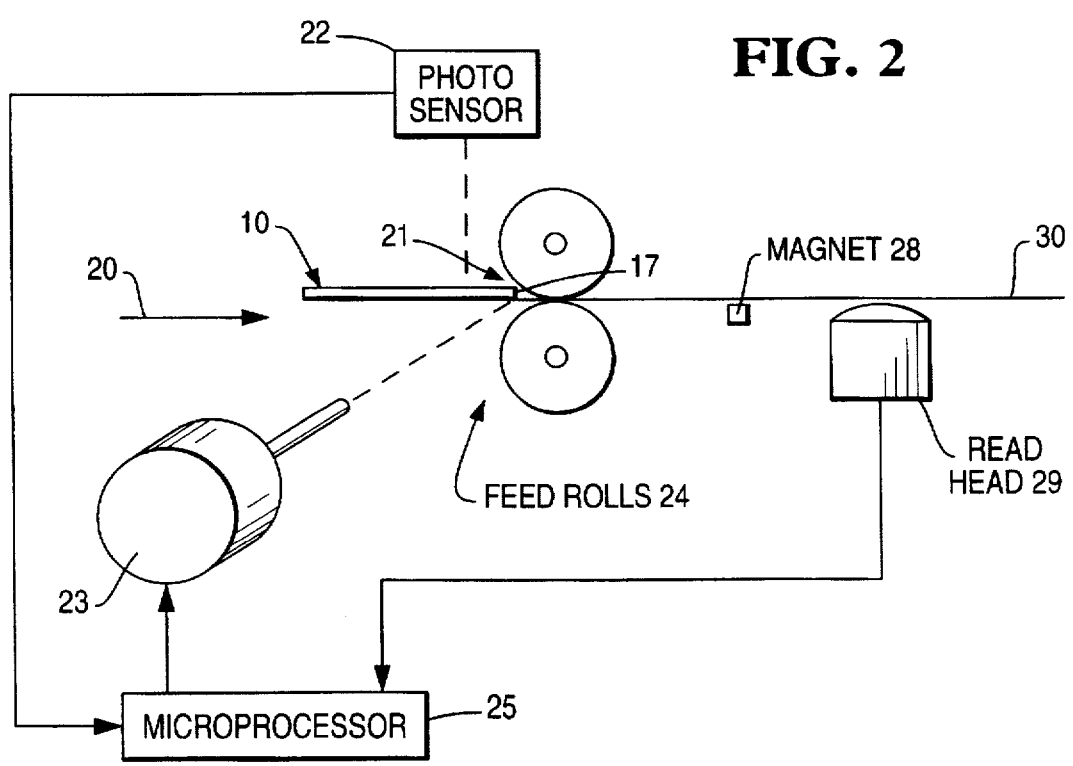
FIG. 2 shows a schematic view of the transport path of a check, as it is being fed into the machine for validating checks and authenticating paper money, as illustrated in FIG. 1.

Referring to FIG. 2, the internal feed path 30 for the currency bill 10 entering (arrow 20) the machine 14 is shown in a schematic diagram. A photo-sensor 22 positioned adjacent the nip 21 of feed rollers 24 senses the forward edge 17 of the bill 10, and generates a signal initiating a microprocessor-controlled feed sequence. Microprocessor 25 sends pulses via an electric circuit (not shown) to the stepper motor 23, which then rotatively actuates the feed rollers 24 through appropriate gearing (not shown). The stepper motor 23 is a 5-volt, direct current (DC), reversible, permanent magnet, 7.5° stepper, Model No. 17BB-HJW-03, manufactured by Minebea Company, Ltd., of Thailand.

The currency bill 10 is fed forward (arrow 20) along feed path 30, passing a magnet 28 that magnetizes a strip of the currency bill 10, thus producing a magnetized signature. Each strip of a different currency denomination will have its own recognizable signature that can be authenticated by the microprocessor 25. The bill 10 with its magnetized strip then passes over a read head 29, as shown. The magnetic signature is not read during the forward movement of the bill 10, but, rather, when the stepper motor 23 reverses direction and discharges the currency bill 10.

Figure 3:
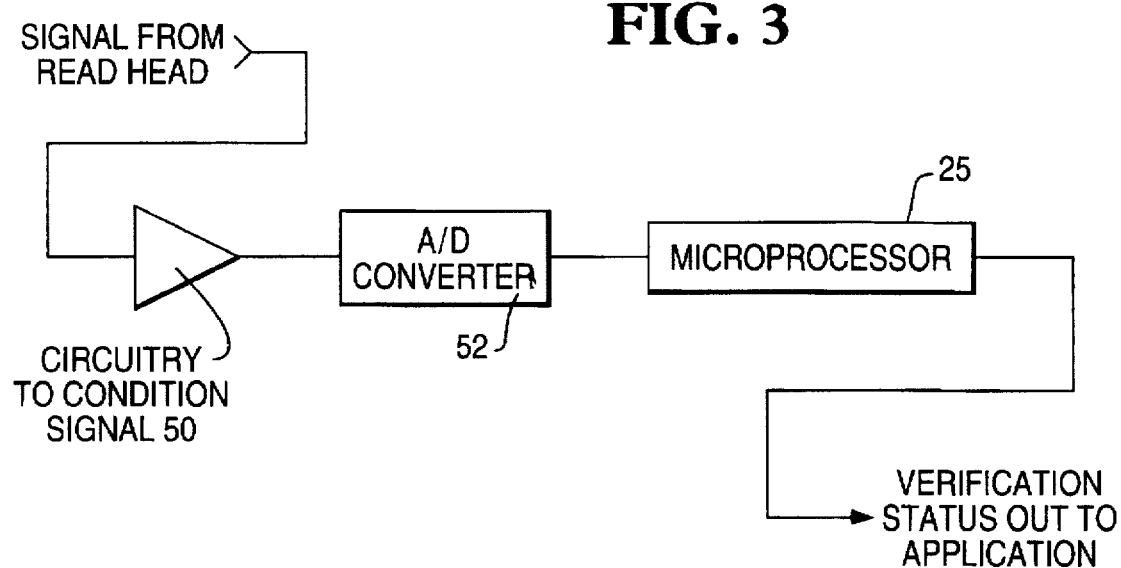
FIG. 3 illustrates a block diagram of the verification electronics used in the machine for validating checks and authenticating paper money, shown in FIG. 1.

Referring to FIG. 3, a block diagram of the verification electronics for authenticating the currency bill 10 in the machine 14 is illustrated. A signal from the read head 29 (FIG. 2) is passed to a conditioning circuit 50. The conditioned signal is digitized by the analog-to-digital (A/D) converter 52. The digitized waveform is passed to the microprocessor 25, which decodes and stores the information. A decoding algorithm that is part of the microprocessor program compares the magnetic signature of the particular bill and compares that signature with genuine Federal Treasury signatures of authentic currency. Each denomination of currency has its own signature. If there is a match with a known signature, the machine 14 will verify the authenticity of the bill.

Figure 4:
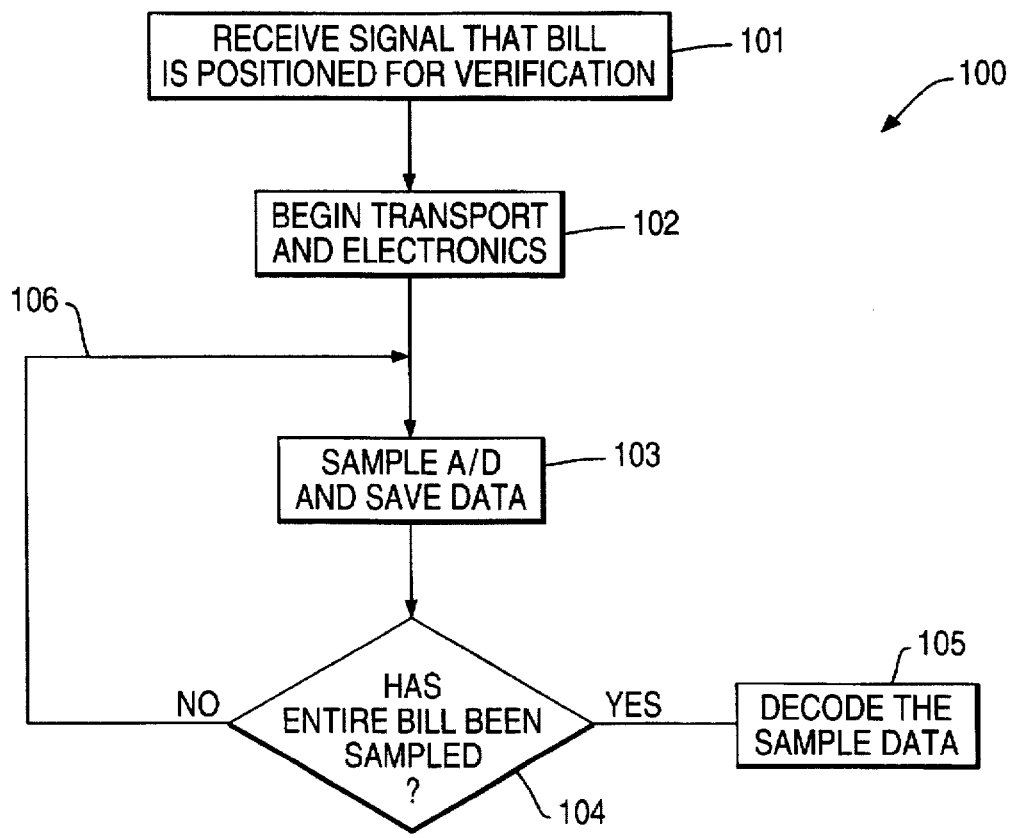
FIG. 4 depicts a flowchart diagram of the microprocessor program for sampling and decoding the numbers on a check and/or the signature on a bill of currency.

Referring to FIG. 4, a flow diagram 100 of the method of this invention is illustrated. The microprocessor 25 (FIG. 3) receives a signal from the photo-sensor 22 that the edge 17 of the currency bill 10 is at the nip 21 of the feed rollers 24, step 101. The microprocessor 25 then initiates the transport of the bill 10 along feed path 30, as well as the appropriate electronics for decoding and authenticating the signature on the magnetized strip of the bill, step 102. Once the magnetized strip passes the read head 29, the stepper motor 23 reverses direction. The magnetic strip is sampled from the currency bill 10, step 103. For each data point read and saved, step 103, the system determines whether the entire bill 10 (FIG. 1) has been sampled, step 104. If not, program control returns over line 106, the bill 10 continues to be fed, and another data point is read, step 103. The microprocessor 25 (FIG. 3) decides whether the entire bill 10 has been sampled by keeping track of the length that has been fed. Alternatively, another suitably disposed sensor (not shown) can be used to detect the leading or trailing edge of the bill. When the microprocessor 25 has determined that enough data has been sampled (collected) to verify the bill 10 or another sensor (not shown) indicates that the bill has been transported a predetermined distance, the sampled data from the read head 29 is decoded and stored in microprocessor memory, step 105.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of authenticating a currency bill, comprising the steps of:

a) feeding a currency bill having magnetizable ink into a check-validation and currency-authentication machine having a common magnetic reader b) moving the currency bill forward into the check-validation and currency-authentication machine by drive-pulsing a stepper motor drive unit;

c) magnetizing the magnetizable ink of a currency bill along a strip thereof, as the currency bill moves forward past a magnetizing unit in said check-validation and currency-authentication machine;

d) reversing movement of said currency bill to discharge said currency bill from said check-validation and currency-authentication machine, past said magnetic reader; and then e) reading a magnetized strip on the currency bill, as the currency bill is discharged in reverse from the machine at a constant speed, whereby a magnetic signature on said currency bill is read by said magnetic reader.

2. The method of authenticating a currency bill in accordance with claim 1, further comprising the steps of:

f) comparing said magnetic signature of the currency bill read in accordance with step (e) with known magnetic signatures; and g) authenticating said currency bill, utilizing a decoding algorithm that is part of a program of a microprocessor, when said magnetically-read signature matches an already-known magnetic signature.

3. The method of authenticating a currency bill in accordance with claim 1, further comprising the step of:

f) storing decoded information in microprocessor memory.

4. A microprocessor-controlled check-validation and currency-authentication machine, comprising:

means defining a feed path disposed in a check-validation and currency-authentication machine having a common read head;

a reversible stepper motor, electrically connected to a programmed microprocessor, for receiving drive commands therefrom and for driving a pair of feed rollers;

said pair of feed rollers being disposed along said feed path for moving a currency bill to be validated along said feed path;

magnetizing means disposed adjacent said pair of feed rollers and along said feed path for magnetizing ink of said currency bill along a strip portion thereof, as said currency bill moves past said magnetizing means in a forward direction;

said read head being disposed adjacent said magnetizing means and along said feed path for reading in a reverse direction a magnetized ink signature on said currency bill, after the ink has been magnetized by said magnetizing means; and a programmed microprocessor electrically connected to said read head and said reversible stepper motor for controlling movement of said bill being processed in said machine, with a program of said programmed microprocessor providing changes in drive direction and drive pulsing for said stepper motor, so that said stepper motor is pulsed to drive said pair of feed rollers when said bill is being fed into said machine in said forward direction, and said stepper motor is then reversed to discharge said bill from said machine in said reverse direction at substantially constant speed, whereby said magnetized ink signature is read and authenticated by said microprocessor.

5. The microprocessor-controlled check-validation and currency-authentication machine in accordance with claim 4, further comprising photo-sensing means disposed adjacent said feed rollers and electrically connected to said programmed microprocessor, said photo-sensing means sensing the presence of said bill being fed by hand into said machine and, in response thereto, generating a signal to initiate a drive and authentication sequence under the control of said programmed microprocessor.

6. A microprocessor-controlled check-validation and currency-authentication machine, comprising:

means defining a feed path disposed in a check-validation and currency authentication machine having a common read head;

a reversible stepper motor, electrically connected to a programmed microprocessor, for receiving drive commands therefrom and for driving a pair of feed rollers;

said pair of feed rollers being disposed along said feed path for moving a currency bill to be authenticated past a magnetizing means and said common read head;

said magnetizing means being disposed adjacent said pair of feed rollers and along said feed path for magnetizing ink of said currency bill along a strip portion thereof, as said currency bill moves forward past said magnetizing means;

said read head being disposed adjacent said magnetizing means and along said feed path for reading in a reverse direction a magnetic signature of said currency bill, after the ink of said currency bill has been magnetized by said magnetizing means;

a programmed microprocessor electrically connected to said read head and said reversible stepper motor for controlling movement of said bill being processed in said check-validation and currency-authentication machine, with a program of said programmed microprocessor providing changes in drive direction and drive pulsing for said stepper motor, so that said stepper motor is pulsed to drive said pair of feed rollers when said bill is being fed into said check-validation and currency-authentication machine in said forward direction, and said stepper motor is then reversed to discharge said currency bill from said check-validation and currency-authentication machine in said reverse direction at substantially constant speed; and photo-sensing means disposed adjacent said feed rollers and electrically connected to said programmed microprocessor, said photo-sensing means sensing the presence of said currency bill being fed by hand into said check-validation and currency-authentication machine and, in response thereto, generating a signal to initiate a drive and authentication sequence under the control of said programmed microprocessor.

7. A machine for validating checks and authenticating currency bills comprising:

means for sequentially transporting along a feed path in forward and reverse directions a paper article configured as a check or currency bill having a magnetic imprint thereon;

means for magnetizing said imprint in said forward direction;

means for reading said magnetized imprint in said reverse direction having a common read head for reading both said check and said bill; and a microprocessor operatively joined to said reading means to decode said magnetic imprint for validating said paper article as said check, and for authenticating said paper article as said bill.

8. A machine according to claim 7 wherein said transporting means include a reversible motor configured for step drive operation in said forward direction, and wave drive operation in said reverse direction for reading said imprint at constant speed.

9. A machine according to claim 8 wherein said microprocessor includes a memory for storing known signatures, and means for comparing said decoded magnetized imprint with said known signatures for obtaining matches therebetween.

10. A machine according to claim 9 wherein said microprocessor is operatively joined to said motor, and is configured to count pulses of said motor in said forward direction until said magnetized imprint passes said read head, and to reverse direction of said motor after counting a corresponding number of said pulses.

* * * * *